US006795577B2

(12) United States Patent
Amonou

(10) Patent No.: US 6,795,577 B2
(45) Date of Patent: Sep. 21, 2004

(54) DIGITAL SIGNAL ANALYSIS, WITH HIERARCHICAL SEGMENTATION

(75) Inventor: Isabelle Amonou, Thorigne-Fouillard (FR)

(73) Assignee: Canon Research Centre France S.A. (FR)

( * ) Notice: Subject to any disclaimer, the term of this patent is extended or adjusted under 35 U.S.C. 154(b) by 738 days.

(21) Appl. No.: 09/726,569

(22) Filed: Dec. 1, 2000

(65) Prior Publication Data

US 2001/0016066 A1 Aug. 23, 2001

(30) Foreign Application Priority Data

Dec. 3, 1999 (FR) .............................. 99 15293

(51) Int. Cl.[7] ................................ G06K 9/34
(52) U.S. Cl. ...................... 382/173; 382/199
(58) Field of Search ................. 382/173, 180, 382/199, 240, 242, 260, 263, 264

(56) References Cited

U.S. PATENT DOCUMENTS 5,898,798 A * 4/1999 Bouchard et al. .......... 382/242
6,058,211 A * 5/2000 Bormans et al. ........... 382/235

OTHER PUBLICATIONS

P. Schroeter, et al., "Hierarchical Image Segmentation by Multi-Dimensional Clustering and Orientation-Adaptive Boundary Refinment", Pattern Recognition, vol. 28, No. 5, pp. 695–709 (1995).

Josep R. Cases, et al., "A region-based subband coding scheme", Signal Processing: Image Communication, vol. 10, pp. 173–200 (1997).

Djamal Boukerroui, et al., Multipresolution Adaptive Image Segmentation Based on Global And Local Statistics, IEEE, pp. 358–361 (1999).

Jean–Marie Beaulieu, et al., "Hierarchy in Picture Segmentation: A Stepwise Optimization Approach", IEEE Trans. on Pattern Analysis, vol. 11, pp. 150–163 (Feb. 1989).

* cited by examiner

*Primary Examiner*—Phuoc Tran
(74) *Attorney, Agent, or Firm*—Fitzpatrick, Cella, Harper & Scinto

(57) ABSTRACT

The invention concerns a method of analyzing a set of data representing physical quantities, including the steps of:

decomposition (E20) of the set of data on a plurality of resolution levels, first segmentation (E21) of at least one sub-part of a given resolution level, into at least two homogeneous regions, said given resolution level not being the highest resolution level in the decomposition, characterized in that it includes the steps of:

extraction (E81) of contour data from the result of the segmentation of the previous steps, second segmentation (E25) of at least one sub-part of the resolution level higher than the given level into at least one homogeneous region, as a function of the contour data extracted.

23 Claims, 7 Drawing Sheets

DIGITAL SIGNAL ANALYSIS, WITH HIERARCHICAL SEGMENTATION

The present invention concerns in general terms the analysis of a digital signal and proposes for this purpose a device and method for analysing a digital signal by decomposition into a plurality of resolution levels, and segmentation.

The purpose of the analysis is to provide a hierarchical segmentation of the signal, thus make it possible to access the objects or regions present in an image, at several resolution levels, with several possible levels of detail. Access to the objects of an image can be used for different purposes:

- selective coding of the objects of the image, granting a higher coding quality to the "important" objects in the image,
- progressive transmission of the date of the image, with transmission of the more important objects before the others,
- extraction of a particular objects from the image, with a view to its manipulation, transmission, coding, and storage.

The present invention is more particularly applicable to the analysis of a digital signal. Hereinafter, the concern will more particularly be with the analysis of digital images or video sequences. A video sequence is defined as a succession of digital images.

There exist several known ways of effecting the decomposition of a signal on several resolution levels; it is for example possible to use Gaussian/Laplacian pyramids, or to decompose the signal into frequency sub-bands at several resolution levels.

The remainder of this description will be concerned with the second case, but it is important to note that the present invention applies to all known multi-resolution decompositions.

In the particular case of a decomposition into frequency sub-bands, the decomposition consists of creating, from the digital signal, a set of sub-bands each containing a limited frequency spectrum. The sub-bands can be of difference resolutions, the resolution of a sub-band being the number of samples per unit length used for representing this sub-band. In the case of an image digital signal, a frequency sub-band of this signal can be considered to be an image, that is to say a bi-dimensional array of digital values.

The decomposition of a signal into frequency sub-bands makes it possible to decorrelate the signals so as to eliminate the redundancy existing in the digital image prior to the compression proper. The sub-bands can then be compressed more effectively than the original signal. Moreover, the low sub-band of such a decomposition is a faithful reproduction, at a lower resolution, of the original image. It is therefore particularly well suited to segmentation.

The segmentation of a digital image will make it possible to effect a partitioning of the image into homogeneous regions which do not overlap in this context, the image is considered to consist of objects with two dimensions. The segmentation is a low-level process whose purpose is to effect a partitioning of the image into a certain number of sub-elements called regions. The partitioning is such that the regions are disconnected and their joining constitutes the image. The regions correspond or do not correspond to objects in the image, the term objects referring to information of a semantic nature. Very often, however, an object corresponds to a region or set of regions Each region can be represented by information representing its shape, colour or texture. The homogeneity of the region of course depends on a particular criteria of ho homogeneity; proximity of the average values or preservation of the contrast or colour, for ample.

Object means an entity of the image corresponding to a semantic unit, for example the face of a person. An object can consist of one or more regions contained in the image. Hereinafter the term object or region will be used indifferently.

Conventionally, the segmentation of the digital image is effected on a single resolution level, which is the resolution of the image itself. Conventionally, the segmentation methods include a first step known as marking, that is to say the interior of the regions housing a local homogeneity is extracted from the image Next a decision stop precisely defines the contours of the areas containing homogeneous data. At the end of this step, each pixel of the image is associated with a label identifying the region to which it belongs. The set of all of the labels of all the pixels is called a segmentation map, This type of segmentation makes it possible to obtain a relatively effective segmentation of the image but has the drawbacks of being slow and not very robust and presenting all the objects at the same resolution.

This is the case for example with the so called MPEG4 standard (from the English "Motion Picture Expert Group"), for which an ISO/IEC standard is currently being produced, in the MPEG4 coder, and more particularly in the case of the coding of fixed images, the decomposition of the image into frequency sub-bands is used conjointly with a segmentation of the image. A step prior to coding (not standardised) is responsible for isolating the objects of the image (video objects) and representing each of the these objects by a mask. In the case of a binary mask, the spatial support of the mask has the same size as the original image and a point on the mask at the value 1 (or respectively 0) indicates that the pixel at the same position in the image belongs to the object (or respectively is outside the object).

For each object, the mask is then transmitted to a shape decoder whilst the texture for each object is decomposed into sub-bands, and the sub-bands are then transmitted to a texture decoder.

This method has a certain number of drawbacks. This is because the object is accessible only at its highest resolution level there is no progressivity in segmentation. Moreover, the number of objects manipulated is a priori the same at all levels, whilst it may be more advantageous to have a number of objects increasing with the (spatial) resolution, that is to say a true conjoint scalability between the resolution and the number of objects.

The article "Multiresolution adaptative image segmentation based on global and local statistics" by Boukerroui, Basset and Baekurt, which appeared in IEEE international Conference on Image Processing, 24–28 Oct. 1999, vol. 1 pages 358 to 361, describes a hierarchical segmentation based on a multiresolution pyramid of an image, effected by discrete wavelet transform, known as DWT.

In addition, the article "Multiresolution image segmentation for region-based motion estimation and compensation" by Salgado, Garcia, Menendez and Rendon, which appeared in IEEE International Conference on image Processing, 24–28 Oct. 1999, vol. 2, pages 135 to 139, describes a hierarchical segmentation also based on a multiresolution pyramid of an image. A partitioning of the image effected at the lowest resolution level is projected onto the higher resolution levels.

However, none of these known methods provides access to the region or objects with different resolution levels, in a consistent and coherent manner. Coherent means here that an object at a given resolution level always descends from a single object with a lower resolution (parent), and gives rise to at least one object at the higher resolution level (child or children).

The present invention aims to remedy the drawbacks of the prior article by providing a method and device for the hierarchical segmentation of a digital signal which offers access to the regions or objects at different resolution levels, in a consistent and coherent manner.

In this context the invention concerns a method of analysing a set of data representing physical quantities, including the steps of, decomposition of the set of data on a plurality of resolution levels,
 segmentation of at least a sub-part of a given resolution level, into at least two homogeneous regions, said given resolution level not being the highest resolution level in the decomposition.
 characterised in that it includes the steps of:
 storage of information representing at least part of the result of the segmentation of the previous step,
 segmentation of at least one sub-part of the higher resolution level into at least one homogeneous region, according to the information stored.

More particularly, the invention proposes a method of analysing a set of data representing physical quantities, including the steps of:

decomposition of the set of data on a plurality of resolution levels,
 first segmentation of at least one sub-part of a given resolution level, into at least two homogeneous regions, said given resolution level not being the highest resolution level in the decomposition,
 characterised in that it includes the steps of;
 extraction of contour data from the result of the segmentation of the previous step,
 second segmentation of at least one sub-part of the resolution level higher than the given level into at least one homogeneous region, as a function of the contour data extracted.

Correlatively, the invention proposes a device for analysing a set of data representing physical quantities, having:

means of decomposing the set of data on a plurality of resolution levels,
 means for the fir segmentation of at least one sub-part of a given resolution level, into at least two homogeneous regions, said given resolution level not being the highest resolution level in the decomposition,
 characterised in that it has:
 means of extracting contour data from the result of the segmentation of the previous step,
 means for the second segmentation of at least one sub-part of the resolution level higher than the given resolution level into at least one homogeneous region, as a function of the extracted contour data.

By virtue of the invention, the segmentation is coherent, or continuous: an object with a given resolution level always descends from a single object with a lower resolution level (parent), and gives rise to at least one object at the higher resolution level (a child or children).

In addition, there is a hierarchical segmentation (at several resolution levels). The advantages of hierarchical segmentation are many:

progressive object-based coding and transmission can be effective at several resolution levels,
 it is possible to segment the image according to finer and finer details or objects on progressing through the resolution levels; the user can thus access the objects of the image with a more or less great level of detail. For example, at a lower resolution, the user often needs only a coarse segmentation (the chest and face of a person). whilst he would wish to access a higher level of detail when the resolution increases (eyes, nose, mouth on the face, etc).
 the robustness of the global segmentation and the speed of segmentation are generally higher in the case of a hierarchical segmentation than in the case of a segmentation at a single level.

According to a preferred characteristic, the decomposition is at each resolution level a decomposition into a plurality of frequency sub-bands. This type of decomposition is normally used in image processing, and is simple and rapid to implement.

According to another preferred characteristic, the first segmentation is effected on a low-frequency sub-band of the given resolution level, This is because the lower-frequency sub-band forms a "simplified" version of the signal, and it is consequently advantageous to effect the segmentation on this sub-band.

According to preferred characteristics, the given resolution level is the lowest resolution level, and the extraction and second segmentation steps are effective iteratively as far as the highest resolution level. Thus a hierarchical segmentation is obtained on all the resolution levels.

According to a preferred characteristic, the second segmentation includes:

a projection of a contour image resulting from the firs segmentation, on said at least one sub-part of tie higher resolution level which is to be segmented,
 a marking of the coefficients of said at least one sub-part of the higher resolution level, as a function of the result of the projection, and
 a decision.

According to another preferred characteristic, the second segmentation is effected on a lower-frequency sub-band of the higher resolution level. As with the first segmentation, it is advantageous to effect the second segmentation on a "simplified" version of the signal.

According to a preferred characteristic, the contour data extraction includes, for each coefficient of the segmented sub-part:

a comparison of said coefficient with its neighbours,
 setting of a contour coefficient corresponding to said coefficient to a first predetermined value if the coefficient is different from at least one of its neighbours, or to a second predetermined value if the coefficient is similar to all its neighbours.

The device has means adapted to implement the above characteristics.

The invention also concerns a digital apparatus including the analysis device, or means of implementing the analysis method. The advantages of the device and digital apparatus are identical to those disclosed above.

The invention also concerns an information storage means, which can be read by a computer or microprocessors integrated or not integrated into the device, possibly removable, storing a program implementing the analysis method.

The characteristics and advantages of the present invention will emerge more dearly from a reading of a preferred embodiment illustrated by the accompanying drawings, in which.

Figure 2:
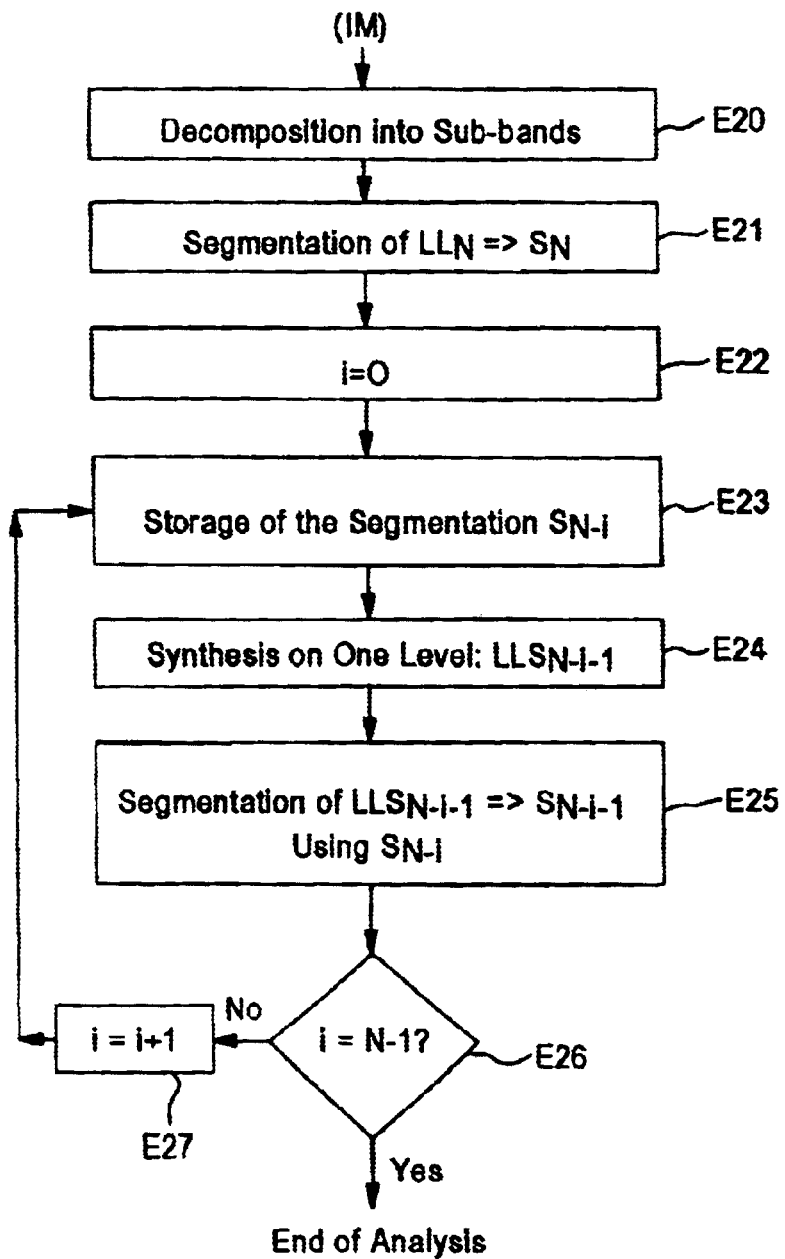
FIG. 2 depicts an analysis algorithm according to the present invention.
Figure 3:
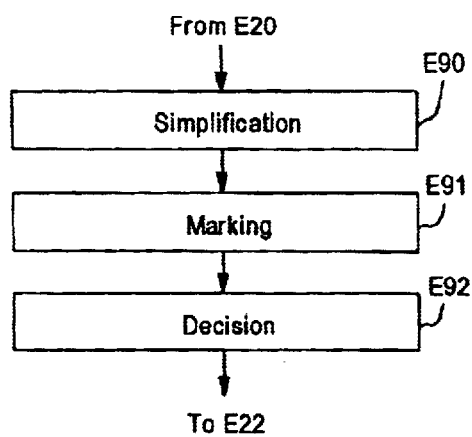
Figure 4:
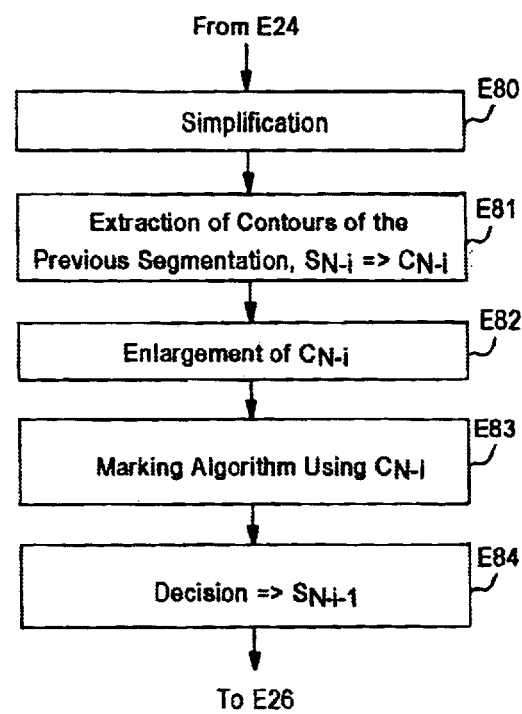
Figure 5:
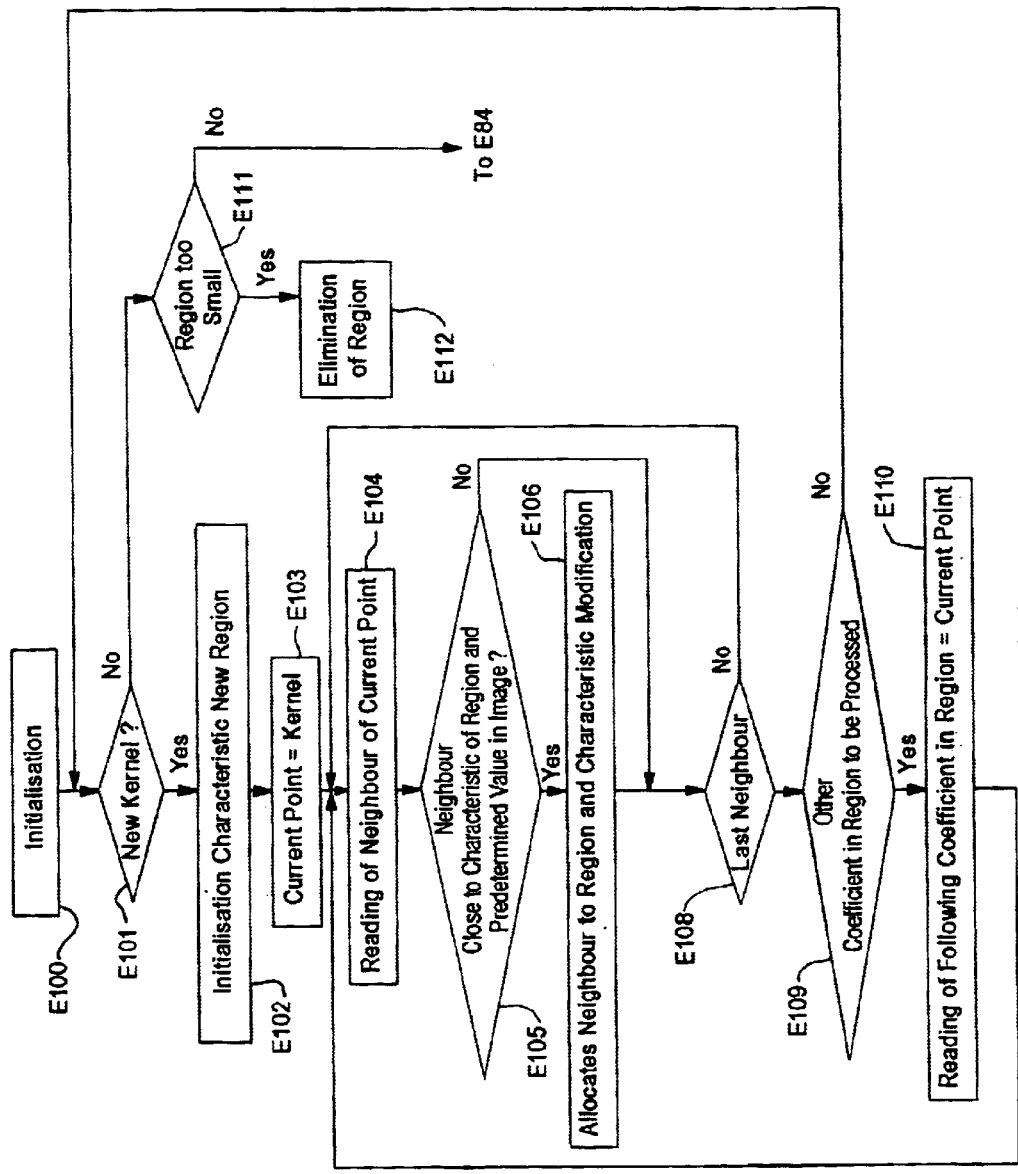
Figure 6:
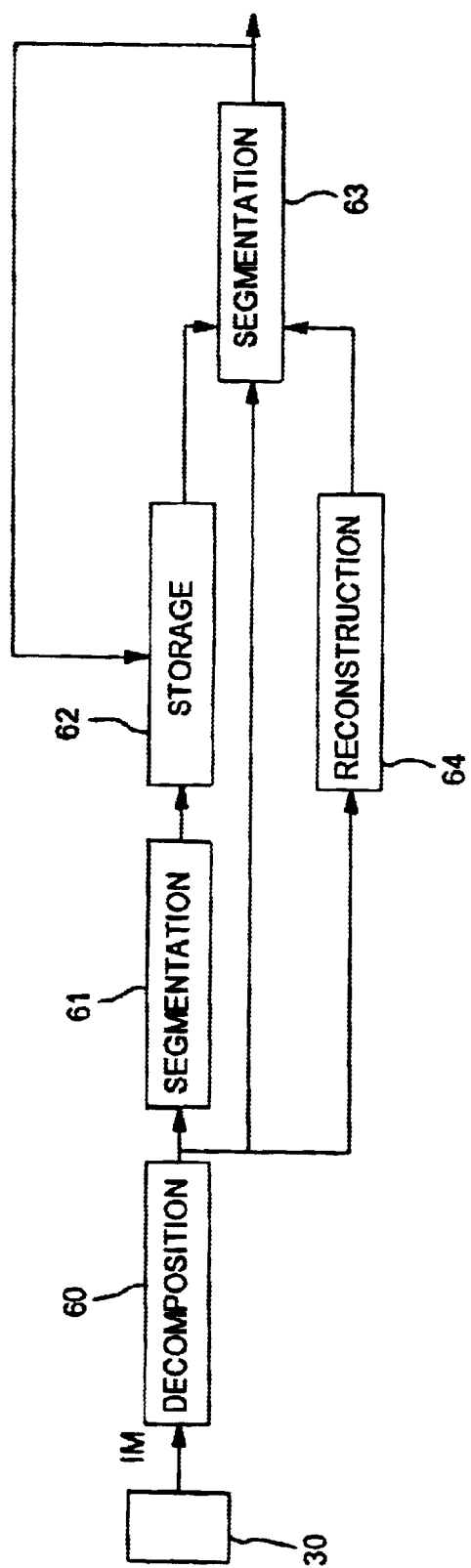
Figure 7:
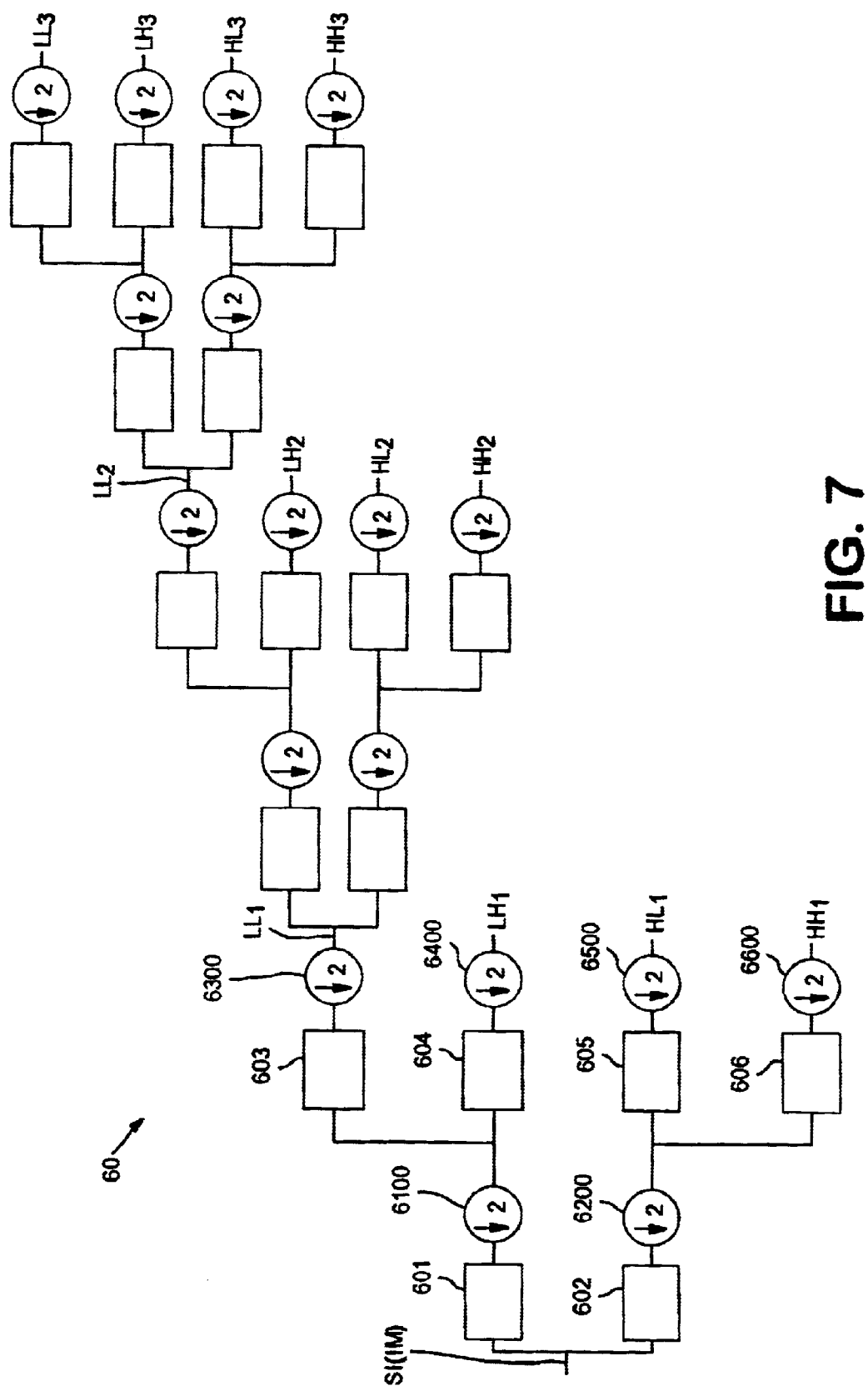
Figure 9:
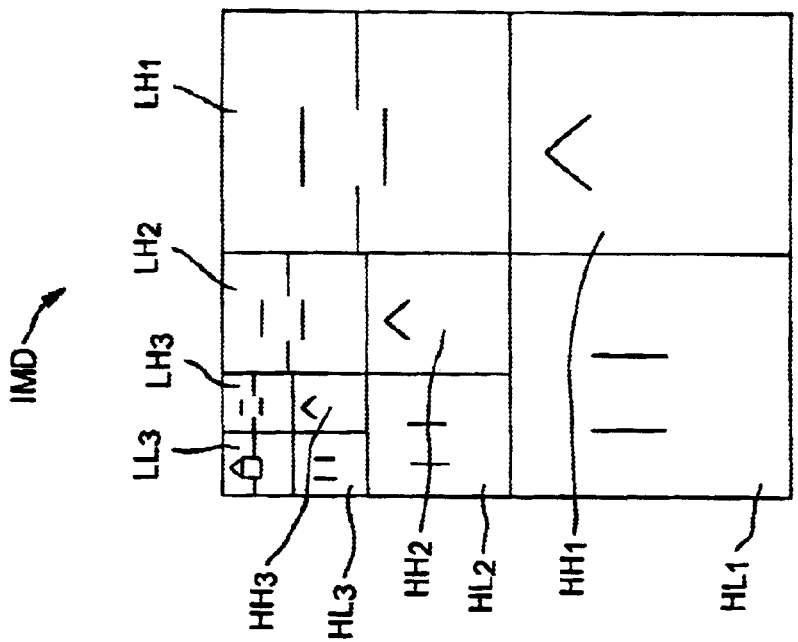
Figure 8:
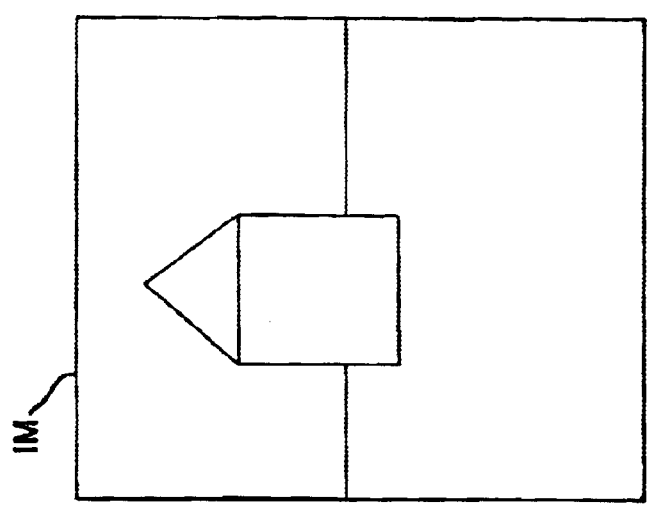

FIG. 3 is an algorithm for implementing the non-assisted segmentation step included in the analysis algorithm of FIG. 2, FIG. 4 is an algorithm for implementing the assisted segmentation step included in the analysis algorithm of FIG. 2, FIG. 5 is an algorithm showing the assisted segmentation steps according to the present invention, FIG. 6 is a block diagram of a device implementing the invention, FIG. 7 is a circuit for decomposition into frequency sub-bands included in the device of FIG. 6, FIG. 8 is a digital image to be analysed according to the present invention, FIG. 9 is an image decomposed into sub-bands according to the present invention.

Figure 1:
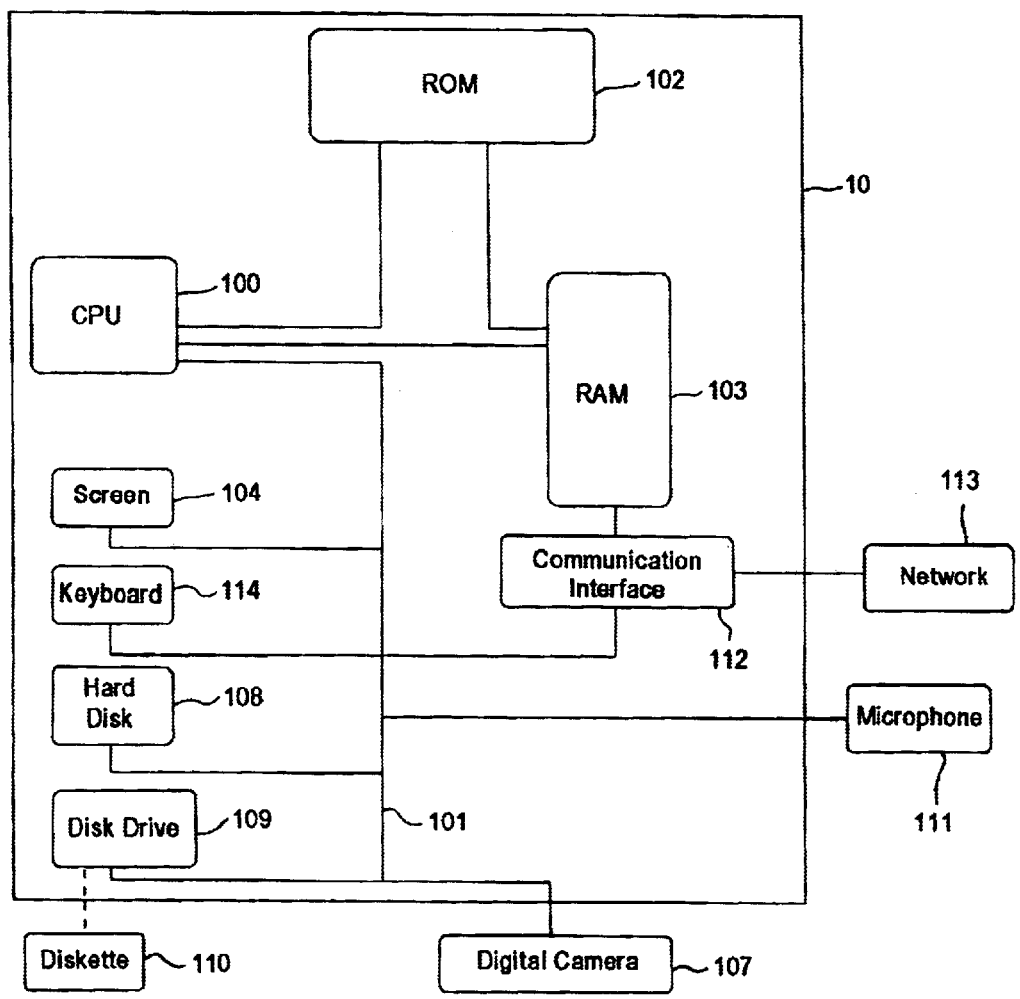
FIG. 1 is an embodiment of a device implementing the invention.

According to the chosen embodiment depicted in FIG. 1, a devise implementing the invention is for example a microcomputer connected to different peripherals, for example a digital camera 107 (or a scanner, or any image acquisition or storage means) connected to a graphics card and supplying information to be analysed according to the invention.

The device 10 has a communicating interface 112 connected to a network 113 able to transmit digital data to be analysed or conversely to transmit data analysed by the device. The device 10 also has a storage means 108 such as for example a hard disk. It also has a drive 109 for a disk 110 This disk 110 can be a diskette, a CD-ROM or a DVD-ROM for example. This disk 110, like the disk 108, can contain data processed according to the invention as well as the program or programmes implementing the invention which, once read by the device 10, will be stored in the hard disk 108. According to a variant, the program enabling the device to implement the invention can be stored in read only memory 102 (referred to as ROM in the drawing). In a second variant, the program can be received in order to be stored in an identical fashion to that described previously by means of the communication network 113.

The device 10 is connected to a microphone 111. The data to be processed according to the invention will in this case be of the audio signal.

This same device has a screen 104 for displaying the data to be analysed or transmitted or serving as an interface with the user, who will be able to parameterise certain analysis modes, using the keyboard 114 or any other means (mouse for example).

The central unit 100 (referred to as CPU in the drawing) executes the instructions relating to the implementation of the invention, instructions stored in the read only memory 102 or in the other storage elements. On powering up, the analysis program stored in a non-volatile memory, for example the ROM 102, are transferred into the random access memory RAM 103, which would then contain the executable code of the invention as well as registers for storing the variables necessary for implementing the invention.

In more general terms, an information storage means, which can be read by a computer or microprocessor, integrated or not into the device, possibly removable, stores a program for implementing the method according to the invention The communication bus 101 affords communication between the different elements included in the microcomputer 10 or connected to it. The representation of the bus 101 is not limitative and notable the central unit 100 is able to communicate instructions to any element of the microcomputer 10 directly or by means of another element of the microcomputer 10.

With reference to FIG. 2, an embodiment of the method of analyzing according to the invention an image IM includes steps E20 to E27 which are run through by the central unit of the device 10 described above. The method includes overall the decomposition of the image on a plurality of resolution levels, then the segmentation of at least a sub-part of a given resolution level, into at least two homogeneous regions, the said given resolution level not being the highest resolution level in the decomposition, followed by the storage of information representing at least part of the result of the segmentation of the previous step and finally the segmentation of at least a sub-part of the higher resolution level into at least one homogeneous region, according to the information stored.

More precisely, the invention includes the extraction of contour data from the result of the segmentation of the previous steps and the segmentation of at least a sub-part of the higher resolution level into at least one homogeneous region, according to the contour data extracted.

Step E20 is the decomposition of the image IM into a plurality of resolution levels and more particularly into a plurality of frequency sub-bands with different resolutions, as will be detailed below with reference to FIG. 9. For example, the decomposition is effected on three resolution levels thus supplying sub-bands $LL_3$, $HL_3$ $LH_3$ and $HH_3$ with the lowest resolution $RES_3$, the sub-bands $HL_2$, $LH_2$ and $HH_2$ of the intermediate resolution level $RES_2$, and the sub-bands $HL_1$, $LH_1$ and $HH_1$ of the highest resolution $RES_1$. It should be noted that, during this step, all the sub-bands $LL_n$, $HL_n$, $LH_n$ and $HH_n$ of a resolution level $RES_n$, where n is an integer, can be stored, or the lower-frequency sub-band $LL_n$ can be stored only for the lowest resolution level, and synthesised for the other levels.

The following step E21 consists of segmenting the low sub-band $LL_N$ in order to supply a segmentation of level N, N being an integer equal for example to 3 if 3 decomposition levels are effected; the low sub-band $LL_N$ is the sub-band $LL_3$ in our example. The result of the segmentation is a segmentation $S_N$ containing at least two distinct regions covering all the segmented sub-band. This segmentation step is detailed below with reference to FIG. 3.

During the following step E22, a parameter i is initialised to the value 0. The parameter i indicates the current resolution level N−i, where N corresponds to the total number of decomposition levels, here 3. This indicator will be subsequently updated at each iteration.

Step E22 is followed by E23, during which at least one region of the segmentation of resolution level N−i is stored in order to be used subsequently during the segmentation step of the immediately higher resolution level.

Step E23 is followed by E24 which, where the low sub-bands $LL_n$ have not been stored, effects a synthesis on the sub-bands of the resolution level N−i in question. The result of the synthesis step is a reconstructed low sub-band $LLS_{N-i-1}$, of resolution immediately higher than the sub-bands which were used for synthesis. Thus, from the sub-bands $LL_3$, $LH_3$, $HL_3$ and $HH_3$ a low sub-band $LLS_2$ of level 2 is reconstructed. Naturally, this step is replaced by a simple reading in memory of the higher resolution level in the case where all the sub-bands have been stored during the decomposition.

During step E25, there is effected a second segmentation of at least one sub-part of the reconstructed level and more precisely of the sub-band $LLS_{N-i-1}$ obtained during step E24. This so-called assisted second segmentation uses two sources as a input: the information stored at step E23, and the current low sub-band $LLS_{N-i-1}$. The purpose of this assisted segmentation step is to provide a segmentation at the current resolution level N–i–1, coherent with the previous resolution level N–i.

Coherent means that the segmentation is continuous, that is to say a region or even an object can be followed from one level to the other. In particular, this coherence implies that an object of level N–i always exists at level N–i–1, and descends from at least one parent object of level N–i–1, if this level exists; during passage to the level N–i–1 of higher resolution, the object of resolution N–i can have been sub-divided into several objects, but cannot have been merged with other objects of resolution N–i; also it cannot have overflowed (apart from a narrow area of tolerance on the contours, as will be explained below) onto another object of resolution level N–i. The assisted segmentation will be described in more detail below.

The following step E26 is a test in order to determine whether all the levels of the decomposition have been processed, that is to say whether the parameter 1 is equal to N–1. If the test is negative, there still remains at least one level to be processed, and in this case step E26 is followed by step E27, which increments the parameter i by one unit. Step E27 is followed by the previously described step E23.

If the test of step E26 is positive, analysis of the digital image is terminated.

The step E21 of segmentation of a sub-part of a resolution level and more particularly of a sub-band is detailed in FIG. 3 and includes sub steps E90 to E92.

Step E90 effects a simplification of the sub-band. A simplified version of the sub-band, more generally of an image, will for example be obtained by applying to the latter a morphological opening/closing operator, followed by a morphological reconstruction. A complete description of this method can be found in the article by Phillippe Salembier entitled "Morphological multiscale segmentation for image coding" which appeared in the magazine "Signal Processing" N° 38 of 1994. This type of processing eliminates the objects smaller than a certain size, and restores the contours of the objects which have not been eliminated. At the end of this step there is therefore a simplified version of the sub-band which will be easier to process by means of the following steps.

The following step E91 is the marking of or extraction of the markers from the simplified sub-band. This step identifies the presence of the homogeneous regions of the simplified sub-band, using a criterion which can for example be a criterion of homogeneity of the intensity of the region (flat region). In concrete terms, use is made here for example of a region growth algorithm, the sub-band is scanned in its entirety (for example from top to bottom and right to left). A "kernel" is sought, that is to say a point, here a coefficient, representing a new region (the first coefficient of the sub-band will automatically be one of these). The characteristic of this region (the mean value) is calculated on the basis of this point. Then all the neighbours of this point are examined, and for each of the neighbours two possibilities are offered:

If the point encountered has an intensity close to the mean value of the region in question, it is allocated to the current region, and the statistics of this region are updated according to this new element, if the point encountered has an intensity which is different (in the sense of a proximity criterion) from the mean value of the region, it is not allocated to the region (it may subsequently be considered to be a new "kernel" representing a new region).

All the points allocated to the current region are then themselves subjected to examination, that is to say all their neighbours are examined (growth phase).

The processing of the region continues thus until all the neighbouring points to the points belonging to the region have been examined. At the end of this processing, the region is considered good or bad if it is bad (typically too small), it is the decision step which will process the points of the region in question. If it is good, the processing is ended for it. A unique label or identifier is then allocated to all the points in the region. The global processing then continues with the search for a new kernel.

The following step E92 is the decision. It consists of attaching to a region all the points which do not have a label at the end of the marking step E91 (typically the points which have been attached to excessively small regions). This step can be performed simply by considering each of the points which do not have a label, and by allocating it to the neighbouring region to which it is closest (in the sense of a proximity criterion), FIG. 4 depicts the step E25 of assisted segmentation of a sub-part of a resolution level and more particularly a sub-band. This step includes sub-steps E80 to E84.

The method includes overall the segmentation of the current low sub-band $LLS_{N-i-1}$ by virtue of the extraction of the contours of the segmentation of the lower resolution level.

Step E80 effects a simplification of the sub-band. A simplified version of the sub-band, more generally of an image, will for example be obtained by applying to the latter a morphological opening/closing operator, followed by a morphological reconstruction A complete description of this method can be found in the article by Philippe Salembier entitled "Morphological multiscale segmentation for image coding" which appeared in the magazine "Signal Processing" "N°" of 1994. This type of processing eliminates the objects smaller then a certain size, and restores the contours of the objects which have not been eliminated. At the end of this step there is therefore a simplified version of the sub-band, which will be easier to process by means of the following steps.

The following step E81 is an extraction of the regions or in other words the contours of the segmentation $S_{N-i}$ which was calculated at the previous step E23, for the lower resolution level.

To extract these contours, the following procedures are for example carried out: all the coefficients of the resolution level processed are scanned, each coefficient different from at least one of its neighbours is considered to be a contour point, and a contour coefficient or label corresponding to this coefficient of the image, in an image of contours $C_{N-i}$, is set to a first pre-determined non-zero value (for example 255); if the coefficient is similar to all its neighbours, it is not considered to be a contour point, and then a second pre-determined value, for example, the value 0, is allocated to the contour coefficient corresponding to it. Naturally, any other method known to the man skill in the art can be envisaged, for example a contour extraction based on a calculation of the gradients of the image (see the work "Two dimensional signal and image processing", J. S. Lim, Prentice Hall International, p 476).

The following step E82 effects a scaling of the image of the contours $C_{N-i}$ previously formed by enlargement; thus the image of the contours at the end of this step is an image with the same resolution as the current low sub-band $LLS_{N-i-1}$ which it is sought to segment. A simple interpolation of the image is for example used: each supplementary pixel in the new contour image is calculated as being equal to the mean of its two neighbours. At the end of this step, all the pixels whose value is different from the predefined value of 0 are considered to contour points. It should be noted that another effect of this step is "thickening" of the contours, which is particularly advantageous for the subsequent step E84. It should also be noted that steps E81 and E82 can easily be reversed, effecting first of all the scaling of the segmentation, and then the extraction of the contours of this new scaled segmentation image.

The following step E83 is the marking of or the extraction of the markers from the simplified sub-band. Unlike step E91, this step uses not only the simplified sub-band but also the image of the contour obtained at the previous steps This step identifies the presence of the homogeneous regions of the simplified sub-band, using a criterion which can for example be a criterion of homogeneity of the intensity of the region (flat regions); these homogeneous regions cannot cross a contour defined by the contour image. In other words, the contours of the contour image, and therefore the boundaries of the regions of the previous segmentation, are considered to be impassable walls for the new segmentation: the new segmentation is therefore forced to respect the regions established at the previous segmentation step at the lower resolution level, and thus a continuity (coherence) of the hierarchical segmentation is ensured, which will be described in more detail with reference to FIG. 5. In concrete terms, use is made here for example of a region growth algorithm: the sub-band is scanned in its entirety (for example from top to bottom and right to left). A "Kernel" is sought, that is to say, a point, here a coefficient, representing a new region (the first coefficient of the sub-band will automatically be one of these). The characteristic of this region (the mean value) is calculated on the basis of this point. Then all the neighbours of this point are then examined, and for each of the neighbours two possibilities are offered:

if the point encountered has an intensity close to the mean value of the region in question, and is situated inside a region (label equal to 0 in the contour image). It is allocated to the current region, and the statistics of this region are updated according to this new element, if the point encountered has an intensity which is different (in the sense of a proximity criterion) from the mean value of the region, or if it belongs to a contour (label different from 0 in the contour image) It is not allocated to the region (in the first case it may subsequently be considered to be a new "kernel" representing a new region).

All the points allocated to the current region are then themselves subject to examination, thus to say all their neighbours are examined (growth phase).

The processing of the region continues thus until all the points adjacent to the points belonging to the region and not belonging to a contour have been examined At the end of this processing, the region is considered to be acceptable or not. If it is not acceptable (typically too small) it is the decision step which will process the points of the region in question. If it is acceptable, the processing is terminated for this new region. A unique label or identifier is then allocated to all the points of the region. The global processing then continues with the search for a new kernel.

The following step E84 is the decision. It is identical to step E92 and its result is the segmentation $S_{N-i-1}$. It consists of attaching to a region all the points which do not have a label at the end of the assisted marking step E83 (typically the points which have been attached to excessively small regions, and the contour points). This step can be effected simply by considering each of the points which do not have a label, and allocating it to the neighbouring region to which it is closest (in the sense of a proximity criterion). The importance of having generated sufficiently "thick" contours during a previous step will be noted here: this is because, the resolution of the image increasing, the precision on the contours is finer and finer, and it is therefore particularly important to allow the decision algorithm to attach all the points which are situated dose to the contour to the most appropriate region. Thus a progressive adaptation of the location of the contours is effected.

FIG. 5 depicts the step E83 of assisted marking of a sub-part of a resolution level and more particularly of a sub-band. This step includes the sub-steps E100 to E112.

This algorithm identifies the presence of the homogeneous regions of the simplified sub-band, using a criterion which can for example be a criterion of homogeneity of the intensity of the region (flat regions): these homogeneous regions cannot cross a contour defined by the image of the contours. In other words, the contours of the contour image, and therefore the boundaries of the regions of the previous segmentation, are considered to be impassable walls for the new segmentation: the new segmentation is therefore forced to respect the regions which have been established at the previous segmentation step at the lower resolution level, and thus continuity (coherence) of the hierarchical segmentation is ensured.

Step E100 is an initiation of scanning of the sub-band. During the running of the algorithm, the sub-band is scanned in its entirety (for example from top to bottom and right to left). At this step a first coefficient of the sub-band is considered.

At the following step E101 a new kernel is sought. For the first passage, the first coefficient of the sub-band is considered to be a kernel.

If a kernel is found, step E101 is Followed by step E102, which is an initalisation for creating a region to which a characteristic is allocated. The characteristic is for example the mean value of the coefficients of the region. At this step, the characteristic is the value of the kernel found at the previous step, Step E103 considers a variable referred to as the current point and associates it with the kernel found at step E101. This current point will be the variable used in the loop of seeking points similar to the region.

A neighbour of the current point is read at step E104.

The following step E105 is a comparison of the current neighbour with the characteristics of the current region and verification in the contour image it the label of this neighbour in the image of the contours is at the predetermined value corresponding to a region.

In the affirmative, step E105 is followed by step E106, at which this point is allocated to the current region and the characteristics of the region are recalculated taking account of this point.

If the response is negative at step E105, the neighbour is for example close to the characteristics of the region but its label in the image of the contours is not at the predetermined value corresponding to any region. This means that this point formed part of a contour during the segmentation of the previous level and is consequently rejected. Step E105 is then followed by step E108, just as step E106 is followed by step E108.

Step E108 consists of checking whether the current neighbour is the last neighbour. If the response is negative, step E108 is followed by the previously described step E104.

If the response is positive at step E108, all the neighbours of the current point have been run through, and step E108 is followed by step E109, which is a test for checking whether there remains at least one coefficient of the region to be processed A non-processed point is a neighbour which has been retained in the region, but whose own neighbours have not been examined.

If the response is positive at step E109, the latter is followed by step E110, which is the reading of an unprocessed coefficient and which allocates its value to the current point variable. Stop E110 is followed by the previously described step E104.

If the response is negative at step E109, all the region has been scanned, and step E109 is followed by step E101 in order to seek another kernel.

If this search is fruitless (all the points of the sub-bands have been examined), step E101 is followed by step E111, which checks whether the previously determined regions are too small, The minimum size of the regions is generally a parameter of the segmentation algorithm. In the affirmative, the regions concerned will be eliminated at step E112.

Steps E111 and E112 are followed by the previously described step E84.

In accordance with FIG. 6, the analysis device according to the invention has:

means of decomposing all the data on a plurality of resolution levels, means of first segmentation of at least one sub-part of a given resolution level, into at least two homogeneous regions, said given resolution level not being the highest resolution level in the decomposition, means of extracting contour data from the result of the segmentation of the previous step, means of second segmentation of at least one sub-part of the resolution level higher than the given level into at least one homogeneous region, according to the extracted contour data.

One embodiment of the device according to the invention has a signal source 30, here for an image signal IM, whether it is a fixed image or an image sequence. In general terms, the signal source either contains the digital signal, and has for example a memory, a hard disk or a CD-ROM, or converts an analogue signal into a digital signal, and is for example an analogue camcorder associated with an analogue to digital converter. The image source 30 generates a series of digital samples representing an image IM. The image signal IM is a series of digital words, for example bytes. Each byte value represents a pixel of the image IMP here with 256 levels of grey or in colour.

An output of the signal source 30 is connected to a circuit 60 for decomposing the image IM into frequency sub-bands, as will be detailed hereinafter with reference to FIG. 7. For example, the decomposition will be carried out on three resolution levels thus supplying sub-bands $LL_3$, $HL_3$, $LH_3$ and $HH_3$ of the lowest resolution level $RES_2$, the sub-bands $HL_2$, $LH_2$ and $HH_2$ of intermediate resolution $RES_2$, and the sub-bands $HL_1$, $LH_2$ and $HH_1$ of the highest resolution $RES_1$. It should be noted that, during this operation, the sub-bands are stored in whole or in part.

The circuit 60 is connected to a circuit 61 for segmenting the low sub-band of the current resolution level. The circuit 61 supplies a segmentation map of the current level. The low sub-band is question is the sub-band $LL_3$ during the first passage, otherwise it is a case either of the low sub-band synthesised by the reconstruction synthesis unit 64, or the sub-band of higher level if this was stored at the time of decomposition. With this segmentation effected, at least some of the information obtained by the segmentation is supplied to a storage circuit 62 which stores this information.

The segmentation circuit makes it possible to extract contour data by means of the following operations which are performed for each coefficient of the segmented sub-band:

comparison of said coefficient with its neighbours, setting a contour coefficient corresponding to said coefficient to a first predetermined value if the coefficient is different from at least one of its neighbours, or to a second predetermined value if the coefficient is similar to all its neighbours.

The circuit 62 is connected to an assisted segmentation circuit 63. The assisted segmentation circuit segments the low sub-band of high resolution level with the information previously stored by the circuit 62.

The assisted segmentation circuit is adapted to perform:

a projection of a contour image resulting from the first segmentation, onto the low sub-band of the higher resolution level which is to be segmented, a marking of the coefficients of said low sub-band of the higher resolution level, according to the result of the projection, and a decision.

If all the sub-bands were stored at the time of decomposition, the segmentation circuit 63 reads the low sub-band of higher resolution stored in memory 62, otherwise the reconstruction circuit 64 reconstructs, using the current sub-band and the other sub-bands of current resolution level, a low sub-band of higher resolution, which is used by the circuit 63.

The circuit 63 supplies as an output a hierarchical segmentation of the image IM.

According to FIG. 7, the circuit 60 has three successive analysis units for decomposing the image IM into sub-bands according to three resolution levels.

In general terms, the resolution of a signal is the number of samples per unit length used for representing this signal. In the case of an image signal, the resolution of a sub-band is related to the number of samples per unit length for representing this sub-band. The resolution depends notably on the number of decimations performed.

The first analysis unit receives the digital image signal and applies it to two digital filters, respectively low pass and high pass 601 and 602, which filter the image signal in a first direction, for example horizontal in the case of an image signal. After passing through decimators by two 6100 and 6200, the resulting filtered signals are respectively applied to two filters, low pass 603 and 605, and high pass 604 and 606, which filter them in a second direction, for example vertical in the case of an image signal. Each resulting filtered signal passes through a respective decimator by two 6300, 6400, 6500 and 6600. The first unit delivers as an output four sub-bands $LL_1$, $LH_1$, $HL_1$ and $HH_1$ of the highest resolution $RES_1$ in the decomposition.

The sub-band $LL_1$ includes the components, or coefficients, of low frequency, in both directions, of the image signal The sub-band $LH_1$ includes the components of low frequency in the first direction and of high frequency in a second direction, of the image signal. The sub-band $HL_1$ includes the components of high frequency in the first direction and the components of low frequency in the second direction. Finally the sub-band $HH_1$ includes the components of high frequency in both directions.

Each sub-band is an image constructed from the original image, which contains information corresponding to a respectively vertical, horizontal and diagonal orientation of the image, in a given frequency band.

The sub-band $LL_1$ is analysed by an analysis unit similar to the previous one for supplying four sub-bands $LL_2$, $LH_2$, $HL_2$ and $HH_2$ of resolution level $RES_2$ intermediate in the decomposition. The sub-band $LL_2$ includes the components of low frequency in the two analysis directions, and is in its turn analysed by the third analysis unit similar to the two previous ones. The third analysis unit supplies sub-bands $LL_3$, $LH_3$, $HL_3$ and $HH_3$, of lowest resolution level $RES_3$ in the decomposition, resulting from the division of the sub-band $LL_2$ into sub-bands.

Each of the sub-bands of resolution $RES_2$ and $RES_3$ also corresponds to an orientations in the image.

The decomposition effected by the circuit 60 is such that a sub-band of a given resolution is divided into four sub-bands of lower resolution and therefore has four times more coefficients than each of the sub-bands of lower resolution.

A digital image IM output from the image source 30 is depicted schematically in FIG. 8, whilst FIG. 9 depicts the image IMD resulting from the decomposition of the image IM, into ten sub-bands according to three resolution levels, by the circuit 60. The image IMD contains as much information as the original image IM, but the information is divided in frequency according to three resolution levels.

The lowest resolution level $RES_3$ contains the sub-bands $LL_3$, $HL_3$, $LH_3$ and $HH_3$, that is to say the sub-bands of low frequency in the two analysis directions. The second resolution level $RES_2$ includes the sub-bands $HL_2$, $LH_2$ and $HH_2$ and the highest resolution level $RES_1$ includes the sub-bands of higher frequency $HL_1$, $LH_1$ and $HH_1$.

The sub-band LL3 of lowest frequency is a reduction of the original image. The other sub-bands are detail sub-bands.

Naturally, the number of resolution levels, and consequently of sub bands, can be chosen differently, for example 13 sub-bands and four resolution levels, for a bi-dimensional signal such as an image. The number of sub-bands per resolution level can also be different. The analysis and synthesis circuits are adapted to the dimension of the signal being processed.

Naturally, the present invention is in no way limited to the embodiments described and depicted, but quite the contrary encompasses any variant within the capability of an expert.

What is claimed is:

1. Method of analysing a set of data representing physical quantities, including the steps of:
   decomposition (E20) of the set of data on a plurality of resolution levels,
   first segmentation (E21) of at least one sub-part of a given resolution level, into at least two homogeneous regions, said given resolution level not being the highest resolution level in the decomposition,
   characterised in that it includes the steps of:
      extraction (E81) of contour data from the result of the segmentation of the previous step,
      second segmentation (E25) of at least one sub-part of the resolution level higher than the given level into at least one homogeneous region, as a function of the contour data extracted.

2. Analysis method according to claim 1, characterised in that the decomposition (E20) is at each resolution level a decomposition into a plurality of frequency sub-bands.

3. Analysis method according to claim 2, characterised in that the first segmentation (E21) is effected on a low-frequency sub-band of the given resolution level.

4. Analysis method according to any one of claims 1 to 3, characterised in that the given resolution level is the lowest resolution level.

5. Analysis method according to claim 4, characterised in that the extraction and second segmentation steps (E25) are effected iteratively as far as the highest resolution level.

6. Analysis method according to claim 5, characterized in that the second segmentation step includes:
   a projection (E82) of a contour image resulting from the first segmentation, on said at least one sub-part of the higher resolution level which is to be segmented,
   a marking (E83) of the coefficients of said at least one sub-part of the higher resolution level, as a function of the result of the projection, and
   a decision (E84).

7. Analysis method according to claim 6, characterised in that the second segmentation (E25) is effected on a low-frequency sub-band of the higher resolution level.

8. Analysis method according to claim 7, characterised in that the contour data extraction (E81) includes, for each coefficient of the segmented sub-part:
   the comparison of said coefficient with its neighbours,
   setting of a contour coefficient corresponding to said coefficient to a first predetermined value if the coefficient is different from at least one of its neighbours, or to a second predetermined value if the coefficient is similar to all its neighbours.

9. Device for analysing a set of data representing physical quantities, having:
   means of decomposing (60) the set of data on a plurality of resolution levels,
   means (61) for the first segmentation of at least one sub-part of a given resolution level, into at least two homogeneous regions, said given resolution level not being the highest resolution level in the decomposition, characterised in that it has:
      means (62) of extracting contour data from the result of the segmentation of the previous step,
      means (63) for the second segmentation of at least one sub-part of the resolution level higher than the given resolution level into at least one homogeneous region, as a function of the extracted contour data.

10. Analysis device according to claim 9, characterized in that the decomposition means (60) are adapted to effect a decomposition which is, at each resolution level, a decomposition into a plurality of frequency sub-bands.

11. Analysis device according to claim 10, characterised in that the fist segmentation means (61) are adapted to effect a segmentation on one low-frequency sub-band of the given resolution level.

12. Analysis device according to any one of claims 9 to 11, characterised in that the first segmentation means (61) are adapted to consider a given resolution level which is the lowest resolution level.

13. Analysis device according to claim 12, characterised in that the means of extraction (62) and second segmentation (63) are adapted to function iteratively as far as the highest resolution level.

14. Analysis device according to claim 13, characterised in that the second segmentation means (63) are adapted to effect:
   a projection of a contour image resulting from the first segmentation, onto said at least one sub-part of the higher resolution level which is to be segmented,
   a marking of the coefficients of said at least one sub-part of the higher resolution level, as a function of the result of the projection, and a decision.

15. Analysis device according to claim 14, characterised in that the second segmentation means (63) are adapted to effect a second segmentation on a low-frequency sub-band of the higher resolution level.

16. Analysis device according to claim 15, characterised in that the contour data extraction means (61, 62) are adapted to effect the following operations, for each coefficient of the segmented sub-part:

comparison of said coefficient with its neighbours, setting a contour coefficient corresponding to said coefficient to a first predetermined value if the coefficient is different from at least one of its neighbours, or to a second predetermined value if the coefficient is similar to all its neighbours.

17. Analysis device (10) according to claim 16, characterised in that the decomposition, extraction and first and second segmentation means are incorporated in:

a microprocessor (100), a read only memory (102) containing a program for processing the data, and a random access memory (103) containing registers adapted to record variable modified during the running of said program.

18. Digital signal processing apparatus, characterised in that it has means adapted to implement the method according to any one of claims 1 to 3.

19. Digital signal processing apparatus, characterised in that it includes the device according to any one of claims 9 to 11.

20. Storage medium storing a program for implementing a method according to any one of claims 1 to 3.

21. Storage medium according to claim 20, characterised in that said storage medium is a floppy disk or a CD-ROM.

22. A storage medium detachably mountable on a device according to any one of claims 9 to 11, wherein said storage medium stores a program for implementing a method of analyzing a set of data representing physical quantities, including the steps of:

decomposing the set data on a plurality of resolution levels;

segmenting at least one sub-part of a given resolution level, into at least two homogeneous regions, the given resolution level not being the highest resolution level in the decomposition;

extracting contour data from the result of the segmentation of said segmenting step; and segmenting at least one sub-part of the resolution level higher than the given level into at least one homogeneous region, as a function of the contour data extracted.

23. The storage medium according to claim 22, wherein said storage medium is a floppy disk or a CD-ROM.

* * * * *

UNITED STATES PATENT AND TRADEMARK OFFICE
CERTIFICATE OF CORRECTION

PATENT NO.     : 6,795,577 B2
DATED          : September 21, 2004
INVENTOR(S)    : Isabelle Amonou It is certified that error appears in the above-identified patent and that said Letters Patent is hereby corrected as shown below:

Column 1,
Line 21, "objects" should read -- object --; and
Line 57, "overlap in" should read -- overlap. In --.

Column 2,
Line 2, "criteria" should read -- criterion --;
Line 2, "ho" should be deleted;
Line 4, "ample" should read -- example --; and
Line 52, "Baekurt" should read -- Baskurt --.

Column 4,
Line 20, "level" should read -- level. --;
Line 31, "firs" should read -- first --;
Line 32, "tie" should read -- the --; and
Line 60, "microprocessors" should read -- microprocessor, --.

Column 5,
Line 21, "devise" should read -- device --; and
Line 56, "are" should read -- is --.

Column 6,
Line 21, "steps" should read -- step. --.

Column 7,
Line 22, "I" should read -- i --.

Column 8,
Line 10, "bad if" should read -- bad. If --;
Line 35, "reconstruction" should read -- reconstruction. --;
Line 36, "Salembler" should read -- Salembier --; and
Line 60, "skill" should read -- skilled --.

Column 9,
Line 6, "to" should read -- to be --;
Line 16, "steps" should read -- step. --.
Line 42, "image). It" should read -- image), it --; and
Line 49, "It" should read -- , it --.

UNITED STATES PATENT AND TRADEMARK OFFICE
CERTIFICATE OF CORRECTION

PATENT NO. : 6,795,577 B2
DATED : September 21, 2004
INVENTOR(S) : Isabelle Amonou It is certified that error appears in the above-identified patent and that said Letters Patent is hereby corrected as shown below:

Column 11,
Line 7, "processed" should read -- processed. --;
Line 51, "IMP" should read -- IM, --;
Line 58, "RES$_2$," should read -- RES$_3$, --;
Line 66, "sub-band is" should read -- sub-band in --.

Column 12,
Line 61, "signal" should read -- signal. --.

Column 13,
Line 32, "LL3" should read -- LL$_3$ --.

Signed and Sealed this

Twenty-eighth Day of February, 2006

JON W. DUDAS
*Director of the United States Patent and Trademark Office*